A. S. BAIRD.
DEVICE FOR CUTTING CROOKED SCREW THREADS.
APPLICATION FILED JUNE 5, 1908.
921,501.
Patented May 11, 1909.
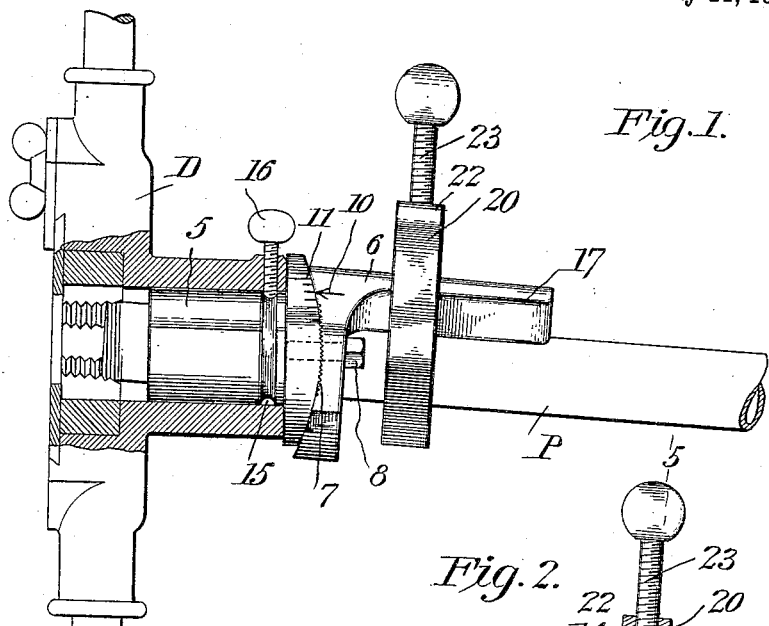
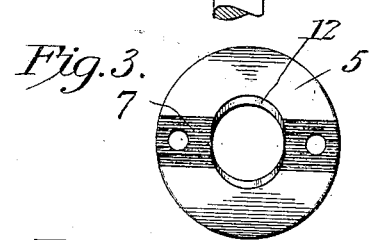
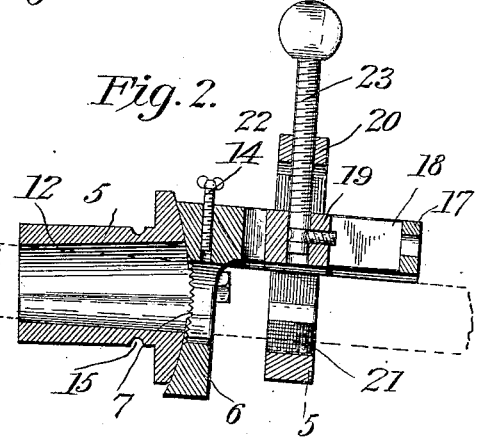
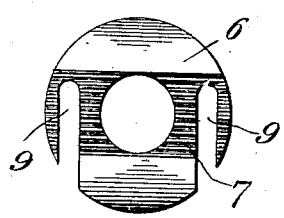
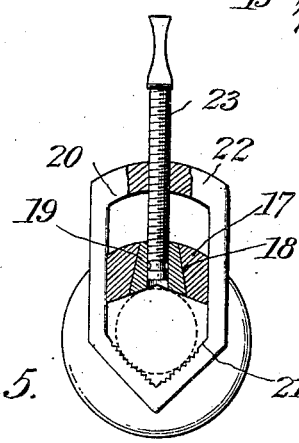
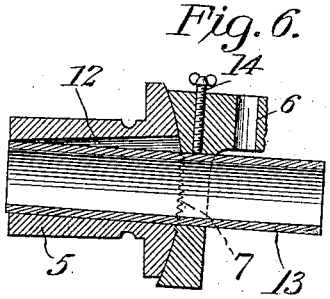
Witnesses
Ernest E. Yost
Fenton S. Belt
Inventor
Alfred S. Baird,
By Wm Baggers &Co
Attorneys.
THE NORRIS PETERS CO., WASHINGTON, D. C.

UNITED STATES PATENT OFFICE.

ALFRED S. BAIRD, OF WASHINGTON, DISTRICT OF COLUMBIA, ASSIGNOR, BY DIRECT AND MESNE ASSIGNMENTS, OF ONE-THIRD TO WILLIAM BAGGER, OF WASHINGTON, DISTRICT OF COLUMBIA, AND ONE-THIRD TO JAMES W. LAWHEAD, OF FALLS CHURCH, VIRGINIA.

DEVICE FOR CUTTING CROOKED SCREW-THREADS.

No. 921,501.        Specification of Letters Patent.        Patented May 11, 1909.

Application filed June 5, 1908. Serial No. 436,906.

*To all whom it may concern:*

Be it known that I, ALFRED S. BAIRD, a citizen of the United States, residing at Washington, in the District of Columbia, have invented certain new and useful Improvements in Devices for Cutting Crooked Screw-Threads, of which the following is a specification.

This invention relates to devices for cutting screw-threads on pipes and the like, and the special object of the invention is to provide a simple and efficient device by means of which crooked threads may be cut, the term "crooked" being used to designate threads cut otherwise than in true alinement with the axis of the pipe upon which such threads are formed.

It frequently happens, especially in connection with the installation of plumbing and heating apparatus, that certain pipes are placed in an inclined position more or less deviating from the horizontal, and that such inclined pipes have to be connected with vertically disposed pipes, such joints deviating more or less from a right angle, and much trouble has been experienced in cutting threads upon pipes to enable such joints to be made. Technically the slightly inclined pipes are known as being placed on a "drunk", and in the language of the trade it has been necessary to cut crooked threads upon the pipes to be connected therewith at an angle deviating from ninety degrees, as also upon pipes that are to be connected at a slight deviation from axial alinement. Various means have been resorted to for the purpose of cutting such crooked threads, but such means have always been attended with more or less difficulty and uncertainty, and the pipes have frequently been spoiled in the cutting, or split in attempting to bend them to the desired position in case the thread has not been cut exactly at the proper angle.

By the present invention, I aim to provide a simple thoroughly efficient device capable of being used in connection with an ordinary screw-cutting die and stock, whereby the die may be guided with its axis at a deviation from the axis of the pipe or member upon which the thread is to be cut, the deviation being predetermined and capable of being accurately gaged or regulated.

With these and other ends in view, which will readily appear as the nature of the invention is better understood, the same consists in the improved construction and novel arrangement and combination of parts, which will be hereinafter fully described and particularly pointed out in the claims.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing—Figure 1 is a side elevation, partly in section, showing the improved device mounted upon a pipe in position for operation, and showing also a die-stock in position for cutting a thread. Fig. 2 is a longitudinal sectional view showing the device, detached. Fig. 3 is an end view of the die-stock-supporting collar. Fig. 4 is an end view of the slidable pipe-engaging collar. Fig. 5 is a vertical transverse sectional view taken on the plane indicated by the line 5—5, in Fig. 2. Fig. 6 is a sectional detail view illustrating a modified form of the die-stock-supporting collar.

Corresponding parts in the several figures are denoted by like characters of reference.

The frame or body of the improved implement is composed of two collars 5 and 6, the former of which is adapted to support an ordinary die-stock, which has been indicated by letter D, while the latter is adapted to be clamped and securely mounted upon the pipe that is to be threaded, but in such a manner as to be capable of sliding longitudinally upon such pipe. The collars 5 and 6 have curved or arcuate contacting faces that are provided with intermeshing teeth or serrations 7 enabling said collars to be very firmly secured or locked together at various angles by connecting members such as bolts 8, which may be threaded into one of the collars and extended through slots 9 in the other collar; it will be readily seen that by loosening the bolts, the collars may be very readily adjusted at various angles to one another; to facilitate the adjustment, one of the collars is provided with a pointer or indicator 10 and the other with a plurality of gage-marks 11.

In order to enable the collar 5 to be tilted or adjusted, said collar is provided with a tapering bore 12, the outer end of said bore being circular and of a diameter corresponding with that of the pipe which is to be threaded, while the inner end of the bore, adjacent to the collar 6, is elongated, as will be clearly seen in Figs. 2 and 3 of the drawing. It will be seen that under this construction the outer end of the collar 5 will be fulcrumed upon the pipe that is to be operated upon in such manner that the inner end of said collar may be tilted or adjusted in an approximately vertical plane; the bore at the outer end of the collar being of a diameter equal to that of the pipe will cause the outer end of the collar to be supported securely in the proper position. For pipes of different sizes collars with different sized bores may be provided; or, if preferred, the collars may be provided with a tubular, cylindrical bushing, as shown at 13 in Fig. 6, said bushing being secured in the collar 6 by means such as a set-screw 14 for the purpose of reducing the bore to the requisite size; a plurality of reducing bushings may be used, if needed. The collar 5 is adapted to support the die-stock D, which may be rotated thereon, and it has an external annular groove 15 to be engaged by the guide-screw 16, which extends through the collar of the die-stock in the usual manner.

The collar 6 is provided with a laterally extending longitudinal bracket 17 having a longitudinal dovetailed slot 18 wherein is slidably-fitted a block 19; a clamping frame 20 surrounds the bracket 17 and the pipe P upon which the device is placed for operation, said clamping frame being preferably formed with a V-shaped grip portion 21, which may be slightly corrugated upon its engaging face so as to firmly grip and hold pipes of various dimensions. The upper or bridge portion 22 of the clamping frame is threaded for the passage of a thumb-screw 23, the point of which has swivel-connection with the block 19, which latter may thus be adjusted to bear tightly against a pipe-section surrounded by the clamping frame.

It will be seen from the foregoing description, and by reference to the drawing hereto annexed, that the improved device operates in the nature of a guide by means of which the die is positively supported with its axis at the requisite angle to the axis of the pipe that is to be threaded, and it follows that the thread will be cut according to the set of the die, or the position to which the collar carrying the die-stock has been adjusted.

Having thus described my invention, what I claim and desire to secure by Letters Patent of the United States is—

1. In a thread-cutting device, a clamping member, a guide slidably engaging the clamping member for longitudinal movement, and a die-stock supporting member adjustably connected with the slidable guide member, and tiltable to various angles with relation to the latter.

2. In a thread-cutting device, the combination with supporting means, of a member carrying a tiltably and slidably supported collar, said carrying member being longitudinally movable on the supporting means and said collar being adjustable to various angles with relation to its line of movement and that of the carrying member.

3. In a thread-cutting device, a slidable member, means for holding the slidable member to the work and for preventing its rotation with relation thereto, a die-stock-supporting collar tiltably connected with the slidable member, and means for securing the collar upon the slide at various adjustments.

4. In a thread-cutting device, the combination with supporting means, of a collar slidable on the supporting means, and a die-stock supporting collar, said collars having arcuate contacting faces; and means for securing said collars together at various adjustments.

5. In a thread-cutting device, a pipe-engaging clamp, a member slidably connected therewith, and a die-stock supporting collar tiltably and adjustably connected with the slidable member.

6. In a thread-cutting device, the combination with supporting means, of a slidable member, a die-stock supporting collar tiltably and adjustably connected with the slidable member, and means for preventing the rotation of the collar with relation to the work; said collar having a tapering bore, circular at one end and elongated at the other end.

7. In a thread-cutting device, supporting means, a carrying member slidably connected therewith, and a die-stock supporting collar tiltably connected with the carrying member and having a tapering bore.

8. In a thread-cutting device, the combination with supporting means, of a slidably supported member and a die-stock supporting collar, said member and collar having arcuate contacting faces provided with intermeshing teeth, and means for securing the slidable member and the collar together at various adjustments and for preventing the rotation of the same with relation to the work.

9. In a thread-cutting device, the combination with supporting means, of a slidably supported collar, a die-stock supporting collar tiltably and adjustably connected therewith and having a tapering bore, a cylindrical tubular bushing extending through the collars, means for securing the bushing in the slidable collar, and means for preventing the rotation of the collar with relation to the work.

10. In a thread-cutting device, a slidable pipe-engaging member having a laterally-extending longitudinally slotted bracket, a pipe-engaging clamping frame surrounding the bracket, a block engaging the longitudinal slot of the bracket, a thumb-screw threaded through the bridge of the clamping-frame and having swivel-connection with the block, and a die-stock-supporting collar tiltably and adjustably connected with the slidable pipe-engaging member.

In testimony whereof I affix my signature in presence of two witnesses.

ALFRED S. BAIRD.

Witnesses:
WM. BAGGER,
BENNETT S. JONES.